US009988529B2

(12) United States Patent
Lu et al.

(10) Patent No.: US 9,988,529 B2
(45) Date of Patent: Jun. 5, 2018

(54) HIGH FLOW POLYARYLETHERKETONE COMPOSITION

(71) Applicant: Ticona LLC, Florence, KY (US)

(72) Inventors: Bing Lu, Union, KY (US); Rong Luo, Florence, KY (US); Yuehua Yu, Cincinnati, OH (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days. days.

(21) Appl. No.: 15/352,635

(22) Filed: Nov. 16, 2016

(65) Prior Publication Data

US 2017/0145208 A1     May 25, 2017

Related U.S. Application Data

(60) Provisional application No. 62/257,790, filed on Nov. 20, 2015, provisional application No. 62/310,930, filed on Mar. 21, 2016, provisional application No. 62/408,206, filed on Oct. 14, 2016.

(51) Int. Cl.
| | |
|---|---|
| *C08K 5/00* | (2006.01) |
| *C08L 61/16* | (2006.01) |
| *C08L 71/00* | (2006.01) |
| *C08G 65/40* | (2006.01) |

(52) U.S. Cl.
CPC ............... *C08L 61/16* (2013.01); *C08L 71/00* (2013.01); *C08G 65/4012* (2013.01); *C08G 2650/40* (2013.01); *C08L 2205/12* (2013.01)

(58) Field of Classification Search
CPC ............................. C08L 61/16; C08L 2205/12
USPC ....................................................... 524/284
See application file for complete search history.

(56) References Cited

U.S. PATENT DOCUMENTS

| | | | |
|---|---|---|---|
| 4,320,224 A | 3/1982 | Rose et al. | |
| 4,343,262 A | 8/1982 | Hunziker, Jr. | |
| 4,438,236 A | 3/1984 | Cogswell et al. | |
| 4,906,784 A | 3/1990 | Skoler | |
| 5,011,894 A | 4/1991 | Robeson et al. | |
| 5,100,973 A | 3/1992 | Robeson et al. | |
| 5,143,985 A | 9/1992 | Robeson et al. | |
| 5,143,986 A | 9/1992 | Reuter et al. | |
| 5,237,038 A | 8/1993 | Morris et al. | |
| 5,352,746 A | 10/1994 | Asai et al. | |
| 5,486,683 A | 1/1996 | Shimizu et al. | |
| 5,492,946 A | 2/1996 | Huspeni et al. | |
| 5,618,889 A | 4/1997 | Kumpf et al. | |
| 5,766,507 A | 6/1998 | Nakai | |
| 6,046,300 A | 4/2000 | Umetsu et al. | |
| 6,613,847 B2 | 9/2003 | Soelch | |
| 6,656,386 B2 | 12/2003 | Suenaga et al. | |
| 6,881,816 B2 | 4/2005 | Gharda et al. | |
| 7,160,980 B2 | 1/2007 | Devine et al. | |
| 7,405,250 B2 | 7/2008 | Kim | |
| 7,407,609 B2 | 8/2008 | Brown | |
| 7,608,648 B2 | 10/2009 | Meakin et al. | |
| 7,824,572 B2 | 11/2010 | Okamoto | |
| 7,825,176 B2 | 11/2010 | Kim et al. | |
| 7,837,896 B2 | 11/2010 | Flath et al. | |
| 7,906,574 B2 | 3/2011 | Meakin et al. | |
| 8,536,265 B2 | 9/2013 | Meakin et al. | |
| 8,603,356 B2 | 12/2013 | Suh et al. | |
| 8,629,232 B2 | 1/2014 | Grant et al. | |
| 8,697,817 B2 | 4/2014 | Waggoner et al. | |
| 8,813,332 B2 | 8/2014 | Leibfried et al. | |
| 8,945,694 B2 | 2/2015 | Aneja et al. | |
| 9,051,514 B2 | 6/2015 | Nair et al. | |
| 9,096,794 B2 | 8/2015 | Nair et al. | |
| 9,102,792 B2 | 8/2015 | Nair et al. | |
| 9,145,499 B2 | 9/2015 | El-Hibri et al. | |
| 9,243,101 B2 | 1/2016 | Meakin et al. | |
| 2005/0100724 A1 | 5/2005 | Seargeant | |
| 2007/0197739 A1 | 8/2007 | Aneja et al. | |
| 2008/0272529 A1 | 11/2008 | Chervin et al. | |
| 2009/0092827 A1 | 4/2009 | Robinson | |
| 2009/0131582 A1 | 5/2009 | Grant et al. | |
| 2011/0003163 A1 | 1/2011 | Wood | |
| 2013/0056108 A1 | 3/2013 | Wood et al. | |
| 2013/0306188 A1 | 11/2013 | Wood et al. | |
| 2014/0004328 A1 | 1/2014 | Kim et al. | |
| 2014/0072739 A1 | 3/2014 | Meakin et al. | |
| 2014/0128566 A1 | 5/2014 | Grant et al. | |
| 2014/0243485 A1* | 8/2014 | Nair ................ C09K 19/22 525/471 |
| 2015/0203712 A1 | 6/2015 | Gopalakrishnan | |
| 2015/0225522 A1 | 8/2015 | Khan et al. | |

FOREIGN PATENT DOCUMENTS

| | | |
|---|---|---|
| CN | 1311263 | 9/2001 |
| CN | 103980478 | 8/2014 |
| GB | 2425495 | 11/2006 |
| GB | 2518495 | 3/2015 |
| JP | S63280730 | 11/1988 |
| JP | S63280731 | 11/1988 |
| JP | S63280732 | 11/1988 |
| JP | H0115926 | 5/1989 |
| JP | H0372559 | 3/1991 |
| JP | H0395260 | 4/1991 |
| JP | H1160927 | 3/1999 |
| JP | 2001/234053 | 8/2001 |
| JP | 2006/225644 | 8/2006 |
| KR | 2012/0052647 | 5/2012 |

(Continued)

OTHER PUBLICATIONS

International Search Report for PCT/US2016/062137 dated Dec. 28, 2016, 12 pages.

(Continued)

*Primary Examiner* — Hui Chin
(74) *Attorney, Agent, or Firm* — Dority & Manning, P.A.

(57) ABSTRACT

A polymer composition that contains a polyaryletherketone and thermotropic liquid crystalline polymer, which are melt processed in the presence of a flow modifier. The flow modifier is a functional compound that contains one or more hydroxyl functional groups.

29 Claims, No Drawings

(56) References Cited

FOREIGN PATENT DOCUMENTS

WO     WO 2007/144610 A1    12/2007
WO     WO 2013/079383 A1     6/2013

OTHER PUBLICATIONS

Product Information for Victrex® Peek 150P from company, dated Jul. 2014, 1 page.
Product Information for Victrex® Peek Peek 150G/151G from company, dated Jul. 2014, 2 pages.

* cited by examiner

HIGH FLOW POLYARYLETHERKETONE COMPOSITION

RELATED APPLICATIONS

The present application claims priority to U.S. Provisional Applications Ser. Nos. 62/257,790, filed on Nov. 20, 2015, 62/310,930, filed on Mar. 21, 2016, and 62/408,206, filed on Oct. 14, 2016, which are incorporated herein in their entirety by reference thereto.

BACKGROUND OF THE INVENTION

Polyetheretherketone ("PEEK") is often used to fabricate parts for numerous engineering applications. Each application requires particular tensile and flexural properties, impact strength, heat distortion temperature, and resistance to warp. PEEK polymers are characterized by a high glass transition temperature, typically above 100° C., which makes them suitable for use in applications that require exposure to high temperatures. One drawback to these materials, however, is that they exhibit poor melt flow properties, which makes processing difficult. As such, a need continues to exist for high performance polymer compositions with excellent melt flow properties.

SUMMARY OF THE INVENTION

In accordance with one embodiment of the present invention, a polymer composition is disclosed that contains at least one polyaryletherketone and at least one liquid crystalline polymer in an amount from about 1 to about 100 parts of a liquid crystalline polymer per 100 parts of the polyaryletherketone. The composition is formed by melt processing the polyaryletherketone and liquid crystalline polymer in the presence of a flow modifier, which includes a functional compound.

Other features and aspects of the present invention are set forth in greater detail below.

DETAILED DESCRIPTION

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3$)$_2$CH), n-butyl ($CH_3CH_2CH2CH_2$), isobutyl (($CH_3$)$_2$CHCH$_2$), sec-butyl (($CH_3$)($CH_3CH_2$)CH), t-butyl (($CH_3$)$_3$C), n-pentyl ($CH_3CH_2CH_2CH_2CH_2$), and neopentyl (($CH_3$)$_3$CCH$_2$).

"Alkoxy" refers to the group —O-alkyl. Alkoxy includes, by way of example, methoxy, ethoxy, n-propoxy, isopropoxy, n-butoxy, t-butoxy, sec-butoxy, and n-pentoxy.

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>C=C<). For example, ($C_x$-$C_y$)alkenyl refers to alkenyl groups having from x to y carbon atoms and is meant to include for example, ethenyl, propenyl, 1,3-butadienyl, and so forth.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Aryloxy" refers to the group —O-aryl, which includes, by way of example, phenoxy and naphthyloxy.

"Carboxyl" or "carboxy" refers to —COOH or salts thereof.

"Carboxyl ester" or "carboxy ester" refers to the groups —C(O)O-alkyl, C(O)O-alkenyl, C(O)O-aryl, C(O)O cycloalkyl, —C(O)O-heteroaryl, and —C(O)O-heterocyclic.

"Cycloalkyl" refers to a saturated or partially saturated cyclic group of from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g., 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C< ring unsaturation.

"Cycloalkyloxy" refers to -O cycloalkyl.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heteroaryloxy" refers to —O-heteroaryl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

"Heterocyclyloxy" refers to the group —O-heterocycyl.

"Acyl" refers to the groups H—C(O)—, alkyl-C(O)—, alkenyl-C(O)—, cycloalkyl-C(O)—, aryl-C(O)—, heteroaryl-C(O)—, and heterocyclic-C(O)—. Acyl includes the "acetyl" group $CH_3C(O)$—.

"Acyloxy" refers to the groups alkyl-C(O)O—, alkenyl-C(O)O—, aryl-C(O)O—, cycloalkyl-C(O)O—, heteroaryl-C(O)O—, and heterocyclic-C(O)O—. Acyloxy includes the "acetyloxy" group $CH_3C(O)O$—.

"Acylamino" refers to the groups —NHC(O)alkyl, —NHC(O)alkenyl, —NHC(O)cycloalkyl, —NHC(O)aryl, —NHC(O)heteroaryl, and —NHC(O)heterocyclic. Acylamino includes the "acetylamino" group —$NHC(O)CH_3$.

It should be understood that the aforementioned definitions encompass unsubstituted groups, as well as groups substituted with one or more other functional groups as is known in the art. For example, an aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester) amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

It is to be understood by one of ordinary skill in the art that the present discussion is a description of exemplary embodiments only, and is not intended as limiting the broader aspects of the present invention.

Generally speaking, the present invention is directed to a polymer composition that contains at least one polyaryletherketone and at least one thermotropic liquid crystalline polymer in an amount from about 1 to about 100 parts, in some embodiments from about 1 to about 50 parts, in some embodiments from about 2 to about 40 parts, and in some embodiments, from about 5 to about 30 parts by weight relative to 100 parts by weight of the polyaryletherketone(s) in the composition. The composition is formed by melt processing the polymers in the presence of a flow modifier that helps achieve a low melt viscosity without sacrificing other properties of the composition. More particularly, the flow modifier is a compound that contains one or more functional groups (e.g., hydroxyl, carboxyl, etc.). Such functional compound(s) are typically present in an amount of from about 0.05 to about 5 parts, in some embodiments from about 0.06 to about 2 parts, in some embodiments from about 0.08 to about 1 part, and in some embodiments, from about 0.1 to about 0.5 parts by weight relative to 100 parts by weight of the polyaryletherketone(s).

Through selective control over the particular nature of the polymers and flow modifier, the present inventors have discovered that the resulting composition can have a lower higher shear melt viscosity, which enables the composition to exhibit better flow properties for use in a wide variety of applications. The high shear melt viscosity may, for instance, be reduced so that the ratio of the melt viscosity of the polymer composition to the initial melt viscosity of the polyaryletherketone may be about 0.80 or less, in some embodiments about 0.50 or less, in some embodiments about 0.40 or less, in some embodiments, from about 0.01 to about 0.30, in some embodiments from about 0.02 to about 0.85, and in some embodiments, from about 0.05 to about 0.50. For example, in one particular embodiment, the polymer composition may have a melt viscosity of from about 0.1 to about 250 Pa-s, in some embodiments from about 0.2 to about 200 Pa-s, in some embodiments from about 0.5 to about 100 Pa-s, in some embodiments from about 1 to about 50 Pa-s, and in some embodiments, from about 2 to about 40 Pa-s, determined at a shear rate of 1000 seconds$^{-1}$ and temperature of 400° C. in accordance with ISO Test No. 11443:2005.

Conventionally, it was believed that polymer compositions having the low viscosity noted above would not also possess sufficiently good thermal and mechanical properties to enable their use in certain types of applications. Contrary to conventional thought, however, the polymer composition of the present invention has been found to possess excellent mechanical properties.

For example, the composition may possess a high impact strength, which is useful when forming small parts. The composition may, for instance, possess a Charpy notched impact strength greater than about 2 kJ/m$^2$, in some embodiments from about 3 to about 40 kJ/m$^2$, and in some embodiments, from about 4 to about 30 kJ/m$^2$, measured at 23° C. according to ISO Test No. 179-1:2010) (technically equivalent to ASTM D256, Method B). The composition may, for instance, possess a Charpy unnotched impact strength of about 10 kJ/m$^2$ or more, in some embodiments about 25 kJ/m$^2$ or more, in some embodiments from about 10 to about 100 kJ/m$^2$, in some embodiments from about 20 to about 80 kJ/m$^2$, and in some embodiments from about 30 to about 60 kJ/m$^2$, measured at 23° C. according to ISO Test No. 179).

The tensile and flexural mechanical properties are also good. For example, the part may exhibit a tensile strength of about 90 MPa or more, in some embodiments about 100 MPa or more, in some embodiments about 110 MPa or more, in some embodiments about 120 MPa or more, and in some embodiments, from about 100 to about 500 MPa, and in some embodiments, from about 130 to about 500 MPa and/or a tensile modulus of about 5,500 MPa or more, in some embodiments about 7,000 MPa or more, and in some embodiments, from about 7,000 MPa to about 20,000 MPa. The tensile elongation at break may be about 0.5% or more, in some embodiments about 1.0% or more, in some embodiments about 2.0% or more, in some embodiments from about 1.0% to about 10%, in some embodiments from about 1.5% to about 7%, and in some embodiments, from about 2% to about 5%. The tensile properties may be determined in accordance with ISO Test No. 527:2012 (technically equivalent to ASTM D638-14) at 23° C.

The part may also exhibit a flexural strength of about 110 MPa or more, in some embodiments about 120 MPa or more, in some embodiments about 140 MPa or more, and in some embodiments, from about 140 MPa to about 500 MPa and/or a flexural modulus of about 3,500 MPa or more, in some embodiments about 4,000 MPa or more, in some embodiments about 4,500 MPa or more, in some embodiments about 5,000 MPa or more, and in some embodiments, from about 4,000 MPa to about 25,000 MPa, and in some embodiments, from about 5,500 MPa to about 25,000 MPa. The flexural properties may be determined in accordance with ISO Test No. 178:2010 (technically equivalent to ASTM D790-10) at 23° C. The molded part may also exhibit a deflection temperature under load (DTUL) of about 300° C. or more, and in some embodiments, from about 310° C. to about 350° C., as measured according to ASTM D648-07 (technically equivalent to ISO Test No. 75-2:2013) at a specified load of 1.8 MPa. In some embodiments, the molded part may also exhibit a deflection temperature under load (DTUL) of about 300° C. or less, in some embodiments from about 100° C. to about 250° C., in some embodiments, from about 125° C. to about 200° C., and in some embodiments, from about from about 130° C. to about 170° C., as measured according to ASTM D648-07 (technically equivalent to ISO Test No. 75-2:2013) at a specified load of 1.8 MPa.

The present inventors have also discovered that the polymer composition can also remain dimensionally stable when shaped into a part, and thus exhibit a relatively low degree of warpage. The degree of warpage may be characterized by low "flatness values" as determined by the test described in more detail below. More particularly, the polymer composition may exhibit a flatness value of about 2.0 millimeters or less, in some embodiments about 1.5 millimeter or less, in some embodiments about 1.0 millimeters or less, and in some embodiments, from about 0.1 to about 0.9 millimeters.

Additionally, the coefficient of linear thermal expansion of a molded part may be about 2 ppm/° C. or greater, in some embodiments about 5 ppm/° C. or greater, in some embodiments about 10 ppm/° C. or greater, in some embodiments, from about 2 ppm/° C. to 100 ppm/° C., in some embodiments, from about 5 ppm/° C. to about 90 ppm/° C., and in some embodiments, from about 10 ppm/° C. to about 80 ppm/° C. in the flow direction, as measured according to ISO 11359. The coefficient of linear thermal expansion of a molded part may be about 10 ppm/° C. or greater, in some embodiments about 20 ppm/° C. or greater, in some embodiments about 30 ppm/° C. or greater, in some embodiments, from about 10 ppm/° C. to 200 ppm/° C., in some embodiments, from about 20 ppm/° C. to about 180 ppm/° C., and in some embodiments, from about 30 ppm/° C. to about 160 ppm/° C. in the transverse direction, as measured according to ISO 11359.

Dimensional stability may also be measured by determining the mold shrinkage of a molded specimen in accordance to ISO 294. A molded part may exhibit a mold shrinkage of about 10% or less, in some embodiments about 5% or less, in some embodiments about 2% or less, in some embodiments about 1% or less, in some embodiments from about 0.001% to 5%, in some embodiments, from about 0.01% to 2.5%, and in some embodiments, from about 0.05% to about 1.5% in the flow direction and/or the transverse direction.

The composition may also allow for improved electrical connectivity. This behavior can be characterized by a relatively low volume resistivity as determined in accordance with IEC 60093. Namely, a molded part formed from the polymer composition may exhibit a volume resistivity of about $1\times10^{13}$ ohm-cm or less, in some embodiments about $1\times10^{11}$ ohm-cm or less, in some embodiments from about $1\times10^{8}$ ohm-cm to about $9\times10^{12}$ ohm-cm, and in some embodiments, from about $1\times10^{9}$ to about $9\times10^{11}$ ohm-cm.

The composition may also exhibit a dielectric constant when measured at 23° C. and a frequency of 1 MHz of about 6 or less, in some embodiments about 5 or less, in some embodiments about 4.5 or less, and in some embodiments about 4 or less, when measured according to IEC 60250. The composition may also exhibit a dielectric strength of about 5 kV/mm or more, in some embodiments about 15 kV/mm or more, and in some embodiments about 25 kV/mm or more to about 100 kV/mm or less, in some embodiments, about 60 kV/mm or less, and in some embodiments, about 50 kV/mm or less, when measured according to IEC 60243.

Various embodiments of the present invention will now be described in more detail.

1. Polymer Composition

A. Polyaryletherketone

Polyaryletherketones are semi-crystalline polymers with a relatively high melting temperature, such as from about 300° C. to about 400° C., in some embodiments from about 310° C. to about 390° C., and in some embodiments, from about 330° C. to about 380° C. The glass transition temperature may likewise be about 100° C. or more, in some embodiments from about 110° C. to about 200° C., and in some embodiments, from about 130° C. to about 160° C. The melting and glass transition temperatures may be determined as is well known in the art using differential scanning calorimetry ("DSC"), such as determined by ISO Test No. 11357:2013. Prior to combination with the liquid crystalline polymer and flow modifier, the initial "neat" polyaryletherketone may have a relatively high melt viscosity. In one particular embodiment, for example, the polyaryletherketone may have a melt viscosity of about 80 Pa-s or more, in some embodiments about 110 Pa-s or more, in some embodiments from about 120 to about 250 Pa-s, and in some embodiments, from about 130 to about 220 Pa-s, determined at a shear rate of 1000 seconds$^{-1}$. Melt viscosity may be determined in accordance with ISO Test No. 11443:2005 at a temperature of 400° C.

Polyaryletherketones typically contain a moiety having the structure of Formula (I) and/or Formula (II):

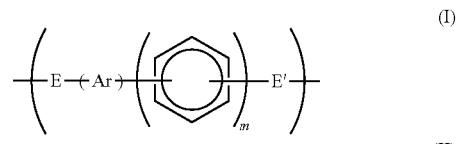

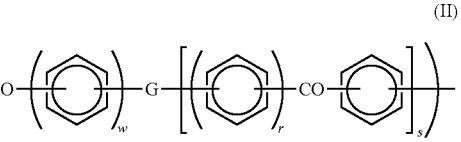

wherein, m and r are independently zero or a positive integer, in some embodiments from 0 to 3, in some embodiments from 0 to 2, and in some embodiments, 0 or 1;

s and w are independently zero or a positive integer, in some embodiments from 0 to 2, and in some embodiments, 0 or 1;

E and E' are independently an oxygen atom or a direct link;

however, only one type of repeat unit of Formula (I) or Formula (II) is provided. In one particular embodiment, for example, the polyaryletherketone is a homopolymer or copolymer containing a repeat unit of the following general Formula (III):

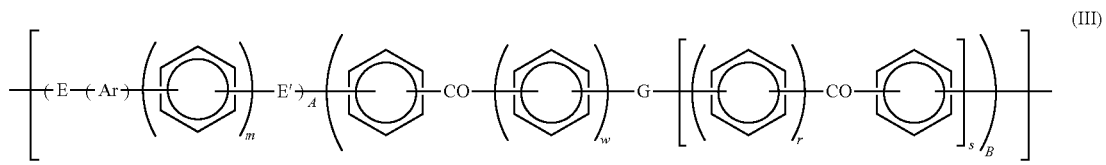

(III)

G is an oxygen atom, a direct link, or —O-Ph-O— where Ph is a phenyl group; and

Ar is one of the following moieties (i) to (vi), which is bonded via one or more of phenyl moieties to adjacent moieties:

wherein,

A and B are independently 0 or 1; and

E, E', G, Ar, m, r, s and w are as described above.

In yet another embodiment, the polyaryletherketone is a homopolymer or copolymer containing a repeat unit of the following general Formula (IV):

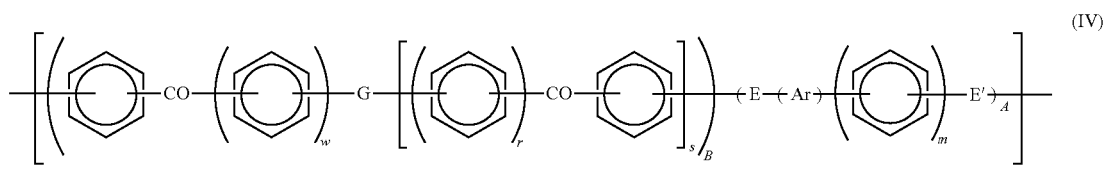

(IV)

wherein,

A and B are independently 0 or 1; and

E, E', G, Ar, m, r, s and w are as described above.

Desirably, Ar in the embodiments above is selected from the following moieties (vii) to (xiii):

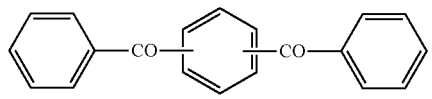
(i)

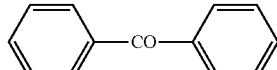
(ii)

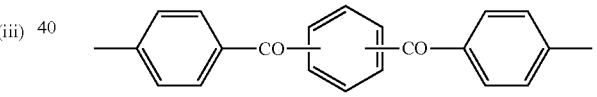
(vii)

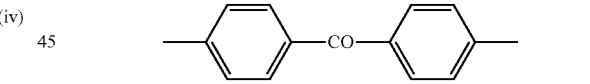
(viii)

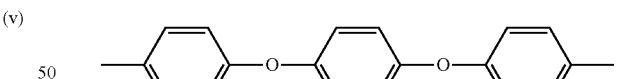
(ix)

(x)

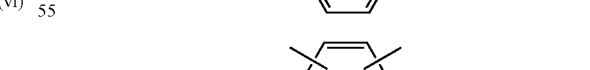
(xi)

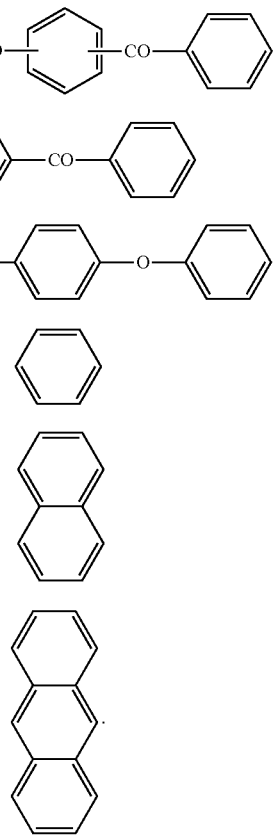
(iii)
(iv)
(v)
(vi)

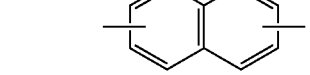
(xii)

The polyaryletherketone may include more than one different type of repeat unit of Formula (I) and/or more than one different type of repeat unit of Formula (II). Typically,

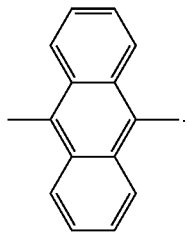

(xiii)

Particularly suitable polyaryletherketone polymers (or copolymers) are those of Formula (III) that primarily include phenyl moieties in conjunction with ketone and/or ether moieties. Examples of such polymers include polyetheretherketone ("PEEK") (wherein in Formula (III), Ar is moiety (iv), E and E' are oxygen atoms, m is 0, w is 1, G is a direct link, s is 0, and A and B are 1); polyetherketone ("PEK") (wherein in Formula (III), E is an oxygen atom, E' is a direct link, Ar is moiety (i), m is 0, A is 1, B is 0); polyetherketoneketone ("PEKK") (wherein in Formula (III), E is an oxygen atom, Ar is moiety (i), m is 0, E' is a direct link, A is 1, and B is 0); polyetherketoneetherketoneketone ("PEKEKK") (wherein in Formula (III), Ar is moiety (i), E and E' are oxygen atoms, G is a direct link, m is 0, w is 1, r is 0, s is 1, and A and B are 1); polyetheretherketoneketone ("PEEKK") (wherein in Formula (III), Ar is moiety (iv), E and E' are oxygen atoms, G is a direct link, m is 0, w is 0, and s, r, A and B are 1); polyether-diphenyl-ether-ether-diphenyl-ether-phenyl-ketone-phenyl (wherein in Formula (III), Ar is moiety (iv), E and E' are oxygen atoms, m is 1, w is 1, A is 1, B is 1, r and s are 0, and G is a direct link); as well as blends and copolymers thereof.

B. Liquid Crystalline Polymer

The liquid crystalline polymer used in the composition of the present invention is generally classified as a "thermotropic" polymer to the extent that it can possess a rod-like structure and exhibit a crystalline behavior in its molten state (e.g., thermotropic nematic state). In one particular embodiment, the liquid crystalline polymer is an aromatic polyester that contains aromatic ester repeating units generally represented by the following Formula (IV):

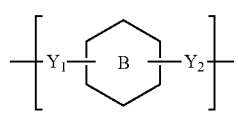

(V)

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O), wherein at least one of $Y_1$ and $Y_2$ are C(O).

Examples of aromatic ester repeating units that are suitable for use in the present invention may include, for instance, aromatic dicarboxylic repeating units ($Y_1$ and $Y_2$ in Formula V are C(O)), aromatic hydroxycarboxylic repeating units ($Y_1$ is O and $Y_2$ is C(O) in Formula V), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA") and isophthalic acid ("IA"). When employed, TA and/or IA may each constitute from about 1 mol. % to about 30 mol. %, in some embodiments from about 2 mol. % to about 20 mol. %, and in some embodiments, from about 5 mol. % to about 15 mol. % of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. One particularly suitable aromatic hydroxycarboxylic acid is 4-hydroxybenzoic acid ("HBA"). When employed, HBA may constitute from about 40 mol. % to about 90 mol. %, in some embodiments from about 45 mol. % to about 85 mol. %, and in some embodiments, from about 50 mol. % to about 70 mol. % of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 20 mol. %, in some embodiments from about 3 mol. % to about 17 mol. %, and in some embodiments, from about 5 mol. % to about 15 mol. %. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 1 mol. % to about 30 mol. %, in some embodiments from about 2 mol. % to about 25 mol. %, and in some embodiments, from about 5 mol. % to about 20 mol. %. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids (e.g., cyclohexane dicarboxylic acid), diols, amides, amines, etc. Of course, in other embodiments, the polymer may be "wholly aromatic" in that it lacks repeating units derived from non-aromatic (e.g., aliphatic or cycloaliphatic) monomers.

Regardless of the particular monomers selected, the liquid crystalline polymer is generally a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is about 15 mol. % or less, in some embodiments about 13 mol. % or less, in some embodiments about 10 mol. % or less, in some embodiments about 8 mol. % or less, in some embodiments from 0 mol. % to about 7 mol. %, and in some embodiments, from 0 mol. % to about 5 mol. % of the polymer (e.g., 0 mol. %). The present inventors have discovered that such low naphthenic polymers are particularly well suited for achieving the unique combination of good thermal and mechanical properties described above.

In one particular embodiment, for example, a "low naphthenic" aromatic polyester may be formed that contains monomer repeat units derived from 4-hydroxybenzoic acid ("HBA"), terephthalic acid ("TA") and/or isophthalic acid ("IA"); 4,4'-biphenol ("BP") and/or hydroquinone ("HQ"), as well as various other optional constituents. In certain embodiments, the aromatic polyester may contain HBA, TA, IA, BP, and HQ. The monomer units derived from HBA may, for instance, constitute from about 40 mol. % to about 85 mol. %, in some embodiments from about 45 mol. % to about 80 mol. %, and in some embodiments, from about 50 mol. % to about 70 mol. % of the polymer. The monomer units derived from TA and IA may each may constitute from about 1 mol. % to about 30 mol. %, in some embodiments from about 2 mol. % to about 20 mol. %, and in some embodiments, from about 5 mol. % to about 15 mol. % of the polymer. Likewise, the monomer units derived from BP and HQ may each may constitute from about 1 mol. % to about 30 mol. %, in some embodiments from about 2 mol. % to about 20 mol. %, and in some embodiments, from about 5 mol. % to about 15 mol. % of the polymer. Regardless of the exact molar amount employed, the molar ratio of BP to HQ repeating units may be controlled so that it is from about 0.6 to about 2.5, in some embodiments from about 0.7 to about 2.0, and in some embodiments, from about 0.8 to about 1.2. Furthermore, the molar ratio of TA to IA repeating units may similarly be controlled so that it is from about 0.6 to about 2.5, in some embodiments from about 0.7 to about 2.0, and in some embodiments, from about 0.8 to about 1.2.

In another particular embodiment, for example, an aromatic polyester may be formed that contains monomer repeat units derived from 4-hydroxybenzoic acid ("HBA"), terephthalic acid ("TA"), 4,4'-biphenol ("BP"), 6-hydroxy-2-naphthoic acid ("HNA"), and acetaminophen ("APAP") as well as various other optional constituents. The monomer units derived from HBA may, for instance, constitute from about 40 mol. % to about 85 mol. %, in some embodiments from about 45 mol. % to about 80 mol. %, and in some embodiments, from about 50 mol. % to about 70 mol. % of the polymer. The monomer units derived from TA may constitute from about 1 mol. % to about 30 mol. %, and in some embodiments from about 2 mol. % to about 20 mol. % of the polymer. Likewise, the monomer units derived from BP may constitute from about 1 mol. % to about 30 mol. %, in some embodiments from about 2 mol. % to about 20 mol. %, and in some embodiments, from about 5 mol. % to about 15 mol. % of the polymer. The monomer units derived from HNA may constitute from about 15 mol. % or less, in some embodiments about 10 mol. % or less, in some embodiments about 8 mol. % or less, and in some embodiments from 0 mol. % to about 7 mol. % of the polymer. The monomer units derived from APAP may constitute from about 1 mol. % to about 30 mol. %, in some embodiments from about 2 mol. % to about 25 mol. %, and in some embodiments, from about 5 mol. % to about 20 mol. % of the polymer.

The liquid crystalline polymer may be prepared by initially introducing the aromatic monomer(s) used to form the ester repeating units (e.g., aromatic hydroxycarboxylic acid, aromatic dicarboxylic acid, etc.) and/or other repeating units (e.g., aromatic diol, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming the liquid crystalline polymer may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder. While unnecessary, it should also be understood that a subsequent solid phase polymerization may be conducted to further increase molecular weight. When carrying out solid-phase polymerization on a polymer obtained by melt polymerization, it is typically desired to select a method in which the polymer obtained by melt polymerization is solidified and then pulverized to form a powdery or flake-like polymer, followed by performing solid polymerization method, such as a heat treatment in a temperature range of 200° C. to 350° C. under an inert atmosphere (e.g., nitrogen).

Regardless of the particular method employed, the resulting liquid crystalline polymer may have a relatively high melting temperature. For example, the melting temperature of the polymer may be from about 250° C. to about 450° C., in some embodiments from about 280° C. to about 420° C., in some embodiments from about 290° C. to about 400° C., and in some embodiments, from about 300° C. to about 400° C. Of course, in some cases, the polymer may not exhibit a distinct melting temperature when determined according to conventional techniques (e.g., DSC).

The melt viscosity of the liquid crystalline polymer may generally vary based on its particular molecular weight. For example, highly flowable, low molecular weight liquid crystalline polymers may have a relatively low melt viscosity, such as from about 1 to about 60 Pa-s, in some embodiments from about 5 to about 50 Pa-s, and in some embodiments, from about 10 to about 40 Pa-s, as determined at a shear rate of 1000 seconds$^{-1}$ and temperature at least 20° C. above the melting temperature (e.g., 350° C., 360° C., or 375° C.). Higher molecular weight polymers may, on the other hand, have a melt viscosity of from about 60 to about 1000 Pa-s, in some embodiments from about 100 to about 800 Pa-s, and in some embodiments, from about 150 to about 400 Pa-s, as determined at a shear rate of 1000 seconds$^{-1}$ and temperature at least 20° C. above the melting temperature (e.g., 350° C., 360° C., or 375° C.). In some embodiments, blends of low and high molecular weight liquid crystalline polymers may also be employed.

C. Functional Compound

The term "functional" generally means that the compound contains at least one functional group (e.g., carboxyl, hydroxyl, etc.) or is capable of possessing such a functional group in the presence of a solvent. The functional compounds used herein may be mono-, di-, tri-functional, etc. The total molecular weight of the compound is relatively low so that it so that it can effectively serve as a flow modifier for the polymer composition. The compound typically has a molecular weight of from about 2,000 grams per mole or less, in some embodiments from about 25 to about 1,000 grams per mole, in some embodiments from about 50 to about 500 grams per mole, and in some embodiments, from about 100 to about 400 grams per mole.

Any of a variety of functional compounds may generally be employed. In certain embodiments, a metal hydroxide compound may be employed that has the general formula $M(OH)_s$, where s is the oxidation state (typically from 1 to 3) and M is a metal, such as a transitional metal, alkali metal, alkaline earth metal, or main group metal. Without intending to be limited by theory, it is believed that such compounds can effectively "lose" water under the process conditions (e.g., high temperature), which can assist in melt viscosity reduction. Examples of suitable metal hydroxides may include copper (II) hydroxide ($Cu(OH)_2$), potassium hydroxide (KOH), sodium hydroxide (NaOH), magnesium hydroxide ($Mg(OH)_2$), calcium hydroxide ($Ca(OH)_2$), aluminum hydroxide ($Al(OH)_3$), and so forth. Also suitable are metal alkoxide compounds that are capable of forming a hydroxyl functional group in the presence of a solvent, such as water. Such compounds may have the general formula $M(OR)_s$, wherein s is the oxidation state (typically from 1 to 3), M is a metal, and R is alkyl. Examples of such metal alkoxides may include copper (II) ethoxide ($Cu^{2+}(CH_3CH_2O^-)_2$), potassium ethoxide ($K^+(CH_3CH_2O^-)$), sodium ethoxide ($Na^+(CH_3CH_2O^-)$), magnesium ethoxide ($Mg^{2+}(CH_3CH_2O^-)_2$), calcium ethoxide ($Ca^{2+}(CH_3CH_2O^-)_2$), etc.; aluminum ethoxide ($Al^{3+}(CH_3CH_2O^-)_3$), and so forth. Besides metal hydroxides, metal salt hydrates may also employed, which are typically represented by the formula $MA*xH_2O$, wherein M is a metal cation, A is an anion, and x is from 1 to 20, and in some embodiments, from 2 to 10. Specific examples of such hydrates may include, for instance, $CaCl_2.H_2O$, $ZnCl_2.4H_2O$, $CoCl_2.6H_2O$, CaSO₄.2H₂O, MgSO₄.7H₂O, CuSO₄.5H₂O, Na₂SO₄.10H₂O, Na₂CO₃.10H₂O, Na₂B₄O₇.10H₂O and Ba(OH)₂.8H₂O.

Hydroxy-functional organic compounds may also be employed. For example, the hydroxy-functional compound may contain a core formed from one or more aromatic rings (including heteroaromatic) similar in nature to the aromatic constituents of the liquid crystalline polymer. Such an aromatic compound may have the general structure provided below in Formula (V):

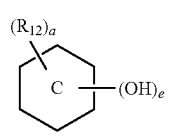

(VI)

or a metal salt thereof, wherein, ring C is a 6-membered aromatic ring wherein 1 to 3 ring carbon atoms are optionally replaced by nitrogen or oxygen, wherein each nitrogen is optionally oxidized, and wherein ring C may be optionally fused or linked to a 5- or 6-membered aryl, heteroaryl, cycloalkyl, or heterocyclyl;

$R_{12}$ is acyl, acyloxy (e.g., acetyloxy), acylamino (e.g., acetylamino), alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycyloxy;

a is from 0 to 4, in some embodiments from 0 to 2, and in some embodiments, from 0 to 1; and e is from 1 to 3, and in some embodiments, from 1 to 2. When the compound is in the form of a metal salt, suitable metal counterions may include transition metal counterions (e.g., copper, iron, etc.), alkali metal counterions (e.g., potassium, sodium, etc.), alkaline earth metal counterions (e.g., calcium, magnesium, etc.), and/or main group metal counterions (e.g., aluminum).

In one embodiment, for example, e is 1 and C is phenyl in Formula (VI) such that the hydroxy-functional compound is a phenol having the following formula (VII):

(VII)

or a metal salt thereof, wherein, $R_{12}$ is acyl, acyloxy, acylamino, alkoxy, alkenyl, alkyl, amino, carboxyl, carboxyl ester, hydroxyl, halo, or haloalkyl; and a is from 0 to 4, in some embodiments from 0 to 2, and in some embodiments, from 0 to 1. Particular examples of such hydroxy-functional phenolic compounds include, for instance, phenol (a is 0); sodium phenoxide (a is 0); hydroquinone ($R_{12}$ is OH and a is 1); resorcinol ($R_{12}$ is OH and a is 1); 4-hydroxybenzoic acid ($R_{12}$ is C(O)OH and a is 1); etc.

In another embodiment, C is phenyl, a is 1, and $R_{12}$ is phenyl in Formula (VI) above such that the hydroxy-functional compound is a biphenyl having the following formula (VIII):

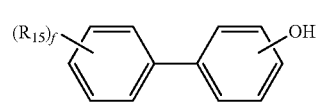

(VIII)

or a metal salt thereof, wherein, $R_{15}$ is acyl, acyloxy, acylamino, alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycyloxy; and f is from 0 to 4, in some embodiments from 0 to 2, and in some embodiments, from 0 to 1. Particular examples of such biphenyl compounds include, for instance, 4,4'-biphenol ($R_{15}$ is OH and f is 1); 3,3'-biphenol ($R_{15}$ is OH and f is 1); 3,4'-biphenol ($R_{15}$ is OH and f is 1); 4-phenylphenol (f is 0); sodium 4-phenylphenoxide (f is 0); bis(4-hydroxyphenyl) ethane ($R_{15}$ is $C_2(OH)_2$phenol and f is 1); tris(4-hydroxyphenyl)ethane ($R_{15}$ is C(CH₃)biphenol and f is 1); 4-hydroxy-4'-biphenylcarboxylic acid ($R_{15}$ is C(O)OH and f is 1); 4'-hydroxyphenyl-4-benzoic acid ($R_{15}$ is C(O)OH and f is 1); 3'-hydroxyphenyl-4-benzoic acid ($R_{15}$ is C(O)OH and f is 1); 4'-hydroxyphenyl-3-benzoic acid ($R_{15}$ is C(O)OH and f is 1); etc.

In yet another embodiment, C is naphthenyl in Formula (VI) above such that the hydroxy-functional compound is a naphthol having the following formula (IX):

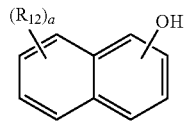

(IX)

or a metal salt thereof, wherein, $R_{12}$ is acyl, acyloxy, acylamino, alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycyloxy; and a is from 0 to 4, in some embodiments from 0 to 2, and in some embodiments, from 0 to 1. Particular examples of such naphthol compounds include, for instance, 2-hydroxynaphthelene (a is 0); sodium 2-naphthoxide (a is 0); 2-hydroxy-6-naphthoic acid ($R_{12}$ is C(O)OH and a is 1); 2-hydroxy-5-naphthoic acid ($R_{12}$ is C(O)OH and a is 1); 3-hydroxy-2-naphthoic acid ($R_{12}$ is C(O)OH and a is 1); 2-hydroxy-3-naphthoic acid ($R_{12}$ is C(O)OH and a is 1); 2,6-dihydroxynaphthalene ($R_{12}$ is OH and a is 1); 2,7-dihydroxynaphthalene ($R_{12}$ is OH and a is 1); 1,6-dihydroxynaphthalene ($R_{12}$ is OH and a is 1); etc.

In addition to those noted above, still other functional compounds may also be employed as flow modifiers in the polymer composition. For instance, carboxy-functional organic compounds can be employed, such as aromatic dicarboxylic acids. Suitable aromatic dicarboxylic acids for this purpose may include, for instance, terephthalic acid, 2,6-napthalenedicarboxylic acid, isophthalic acid, 4,4'-bibenzoic acid, 2-methylterephthalic acid, etc., as well as combinations thereof.

D. Other Components

In certain embodiments of the present invention, the present inventors have discovered that the improved mechanical properties can be achieved without the presence of a substantial amount of fillers (e.g., reinforcing fibers or mineral fillers). For example, the polymer composition may contain only a relatively small percentage, if any, of fillers, such as no more than about 5 wt. %, in some embodiments no more than about 3 wt. %, and in some embodiments, from 0 wt. % to about 2 wt. % (e.g., 0 wt. %) of the polymer composition. In such embodiments, polyaryletherketones typically constitute the substantial majority of the composition, such as from about 60 wt. % to about 99.5 wt. %, in some embodiments from about 70 wt. % to about 99 wt. %, and in some embodiments, from about 75 wt. % to about 95 wt. % of the polymer composition. Liquid crystalline polymer(s) may likewise constitute from about 0.5 wt. % to about 60 wt. %, in some embodiments from about 1 wt. % to about 50 wt. %, and in some embodiments, from about 5 wt. % to about 30 wt. % of the polymer composition.

In other embodiments, the polymer composition may nevertheless be filled with a relatively high percentage of fillers, such as from about 5 wt. % to about 70 wt. %, in some embodiments from about 10 wt. % to about 60 wt. %, and in some embodiments, from about 20 wt. % to about 50 wt. %. In such embodiments, polyaryletherketones typically constitute from about 10 wt. % to about 80 wt. %, in some embodiments from about 20 wt. % to about 70 wt. %, and in some embodiments, from about 30 wt. % to about 65 wt. % of the polymer composition. Liquid crystalline polymer(s) may likewise constitute from about 0.2 wt. % to about 30 wt. %, in some embodiments from about 0.5 wt. % to about 25 wt. %, and in some embodiments, from about 1 wt. % to about 20 wt. % of the polymer composition.

When employed, any of a variety of fillers may be selected for use in the polymer composition. For instance, reinforcing fibers may be employed in certain embodiments. The reinforcing fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulative property, which is often desirable for use in certain applications, the reinforcing fibers may be formed from materials that are also generally insulative in nature, such as glass, ceramics (e.g., alumina or silica), etc., as well as mixtures thereof. Glass fibers are particularly suitable, such as E-glass, A-glass, C-glass, D-glass, AR-glass, R-glass, S1-glass, S2-glass, etc., and mixtures thereof. Besides glass, other suitable fibers may include polymer fibers, metal fibers, carbonaceous fibers (e.g., graphite, carbide, etc.), other types inorganic fibers, etc., as well as combinations thereof. Other inorganic fibers may include titanates (e.g., potassium titanate); silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. If desired, the reinforcing fibers may be provided with a sizing agent or other coating as is known in the art. Regardless of the particular type selected, it is generally desired that the fibers have a relatively low elastic modulus to enhance the processability of the resulting polymer composition. The fibers may, for instance, have a Young's modulus of elasticity of less than about 76 GPa, in some embodiments less than about 75 GPa, and in some embodiments, from about 10 to about 74 GPa, as determined in accordance with ASTM C1557-14.

In certain embodiments, at least a portion of the reinforcing fibers have a relatively flat cross-sectional dimension in that they have an aspect ratio of from about 1.5 to about 10, in some embodiments from about 2 to about 8, and in some embodiments, from about 3 to about 5. The aspect ratio is determined by dividing the cross-sectional width of the fibers (i.e., in the direction of the major axis) by the cross-sectional thickness of the fibers (i.e., in the direction of the minor axis). The shape of such fibers may be in the form of an ellipse, rectangle, rectangle with one or more rounded corners, etc. The cross-sectional width of the fibers may be from about 1 to about 50 micrometers, in some embodiments from about 5 to about 45 micrometers, and in some embodiments, from about 10 to about 35 micrometers. The fibers may also have a thickness of from about 0.5 to about 30 micrometers, in some embodiments from about 1 to about 20 micrometers, and in some embodiments, from about 3 to about 15 micrometers. It should be understood that the cross-sectional thickness and/or width need not be uniform over the entire cross-section. In such circumstances, the cross-sectional width is considered as the largest dimension along the major axis of the fiber and the cross-sectional thickness is considered as the largest dimension along the minor axis. For example, the cross-sectional thickness for an elliptical fiber is the minor diameter of the ellipse.

The reinforcing fibers may also have a narrow size distribution. That is, at least about 60% by volume of the fibers, in some embodiments at least about 70% by volume of the fibers, and in some embodiments, at least about 80% by volume of the fibers may have a width and/or thickness within the ranges noted above. The fibers may be endless or chopped fibers, such as those having a length of from about 1 to about 15 millimeters, and in some embodiments, from about 2 to about 6 millimeters. The dimension of the fibers (e.g., length, width, and thickness) may be determined using known optical microscopy techniques.

When employed, the amount of reinforcing fibers may be selectively controlled to achieve the desired combination of high flow and good mechanical properties. The reinforcing fibers may, for example, be employed in an amount of from about 10 to about 80 parts, in some embodiments from about 20 to about 70 parts, and in some embodiments, from about 30 to about 60 parts per 100 parts by weight of polyaryletherketone(s) employed in the polymer composition. The reinforcing fibers may, for instance, constitute from about 5 wt. % to about 60 wt. %, in some embodiments from about 10 wt. % to about 50 wt. %, and in some embodiments, from about 20 wt. % to about 40 wt. % of the polymer composition. Polyaryletherketone(s) may likewise constitute from about 20 wt. % to about 95 wt. %, in some embodiments from about 40 wt. % to about 90 wt. %, and in some embodiments, from about 50 wt. % to about 80 wt. % of the polymer composition.

Mineral fillers may also be employed in the polymer composition. For instance, clay minerals may be particularly suitable. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2$ $(Si,Al)_4O_{10}[(OH)_2,(H_2O)]$), montmorillonite ($Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2$ $Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Still other additives that can be included in the polymer composition may include, for instance, antimicrobials, pigments (e.g., carbon black), antioxidants, stabilizers, surfactants, waxes, solid solvents, and other materials added to enhance properties and processability. Lubricants, for instance, may be employed in the polymer composition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

II. Method for Forming the Polymer Composition

The manner in which the polymers are combined may vary as is known in the art. For instance, the raw materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the polyaryletherketone, liquid crystalline polymer, and functional compound may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 200° C. to about 500° C., and in some embodiments, from about 250° C. to about 400° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

The resulting polymer composition may exhibit a relatively high glass transition temperature. For example, the glass transition temperature of the polymer composition may be about 50° C. or more, in some embodiments about 70° C. or more, in some embodiments from about 80° C. to about 260° C., and in some embodiments, from about 90° C. to about 200° C. The melting temperature may also be about 300° C. to about 400° C., in some embodiments from about 310° C. to about 390° C., and in some embodiments, from about 330° C. to about 380° C. The glass transition and melting temperatures may be determined as is well known in the art using differential scanning calorimetry ("DSC"), such as determined by ISO Test No. 11357:2013.

III. Shaped Parts

The polymer composition may be employed in a wide variety of shaped parts, which can in turn be formed using various techniques. For example, the polymer composition may be shaped into a part using a molding technique, such as injection molding, compression molding, cast molding, nanomolding, overmolding, etc. For example, as is known in the art, injection molding can occur in two main phases—i.e., an injection phase and holding phase. During the injection phase, the mold cavity is completely filled with the molten polymer composition. The holding phase is initiated after completion of the injection phase in which the holding pressure is controlled to pack additional material into the cavity and compensate for volumetric shrinkage that occurs during cooling. After the shot has built, it can then be cooled. Once cooling is complete, the molding cycle is completed when the mold opens and the part is ejected, such as with the assistance of ejector pins within the mold. Regardless of the molding technique employed, it has been discovered that the polymer composition of the present invention, which may possess the unique combination of high flowability, good mechanical properties, and low warpage, is particularly well suited for thin molded parts. For example, the part may have a thickness of about 100 millimeters or less, in some embodiments about 50 millimeters or less, in some embodiments from about 100 micrometers to about 10 millimeters, and in some embodiments, from about 200 micrometers to about 1 millimeter. If desired, the polymer may also be integrated with or laminated to another component to form a composite structure. This may be accomplished using a variety of techniques, such as by nanomolding the polymer composition onto a portion or the entire surface of the other component so that it forms a resinous component that is adhered thereto.

Of course, other techniques for forming shaped parts may be employed. In one embodiment, for instance, the polymer composition may be melt extruded into a sheet that can be used to form a film, fiber, thermoformed article, coating, etc. Suitable melt extrusion techniques may include, for instance, tubular trapped bubble film processes, flat or tube cast film processes, slit die flat cast film processes, etc. For instance, the components of the polymer composition may be initially fed to an extruder that heats the composition to a temperature sufficient for it to flow and produces a precursor sheet. Before having a chance to solidify, the precursor sheet may optionally be fed into a nip of a calendering device (e.g., calendering rolls) to form a polymeric sheet have a more uniform thickness.

Regardless of the particular technique employed, the resulting shaped part may be employed in a wide variety of devices. One such device is a portable electronic device, which may contain a frame or housing that includes a molded part formed according to the present invention. Examples of portable electronic devices that may employ such a molded part in or as its housing include, for instance, cellular telephones, portable computers (e.g., laptop computers, netbook computers, tablet computers, etc.), wristwatch devices, headphone and earpiece devices, media players with wireless communications capabilities, handheld computers (also sometimes called personal digital assistants), remote controllers, global positioning system (GPS) devices, handheld gaming devices, camera modules, integrated circuits (e.g., SIM cards), etc. Wireless portable electronic devices are particularly suitable. Examples of such devices may include a laptop computer or small portable computer of the type that is sometimes referred to as "ultraportables." In one suitable arrangement, the portable electronic device may be a handheld electronic device. The device may also be a hybrid device that combines the functionality of multiple conventional devices. Examples of hybrid devices include a cellular telephone that includes media player functionality, a gaming device that includes a wireless communications capability, a cellular telephone that includes game and email functions, and a handheld device that receives email, supports mobile telephone calls, has music player functionality and supports web browsing.

It should also be understood that the polymer composition and/or shaped part of the present invention may be used in a wide variety of other types of devices. For example, the polymer composition may be used in components such as bearings, electrical sensors, coils (e.g., pencil, ignition, etc.), clamps (e.g., hose clamps), valves, switches, printer parts, pumps (e.g., gear pumps, pump impellers, pump housings, etc.), dashboards, pipes, hoses (e.g., for vehicular exhaust systems), tubes, oil and gas flowlines (e.g., downhole centralizer), compressors (e.g., valve plates). For example, in one embodiment, an elongated member may be formed that has a hollow interior to allow the passage of a fluid (e.g., oil, fuel, water, exhaust gases, etc.). The elongated member may have a variety of shapes, such as tubular or other complex shapes. The elongated member may extend in a single direction or in multiple directions so that it includes multiple angular displacements. In one embodiment, the elongated member may be formed without a hollow interior and may include cable ties.

It should also be understood that the polymer composition and/or shaped part of the present invention may have many other applications. For instance, the may be used in automotives, such as for connectors and in particular under-the-hood electrical connectors. They may also be utilized in with electronics in manufacturing thin-walled, intricate components, such as capacitors, connectors, resistors, and microswitches. They may also be utilized in the oil and gas industry for machined parts such as rings, seals, and highly filled profiles and designed for high temperature corrosion resistance. They may even be employed for manufacturing parts having complex geometries for diagnostic and analytical instrumentation.

In one embodiment, the polymer composition is employed for the manufacture of a connector, such as an electrical connector. In particular, the polymer composition may be employed for manufacturing a connector housing. The connector may have any number of different configurations. The polymer composition enables the molding of thin-walled, intricate parts, such as those of a connector housing.

The present invention may be better understood with reference to the following examples.

Test Methods

Melt Viscosity: The melt viscosity (Pa-s) may be determined in accordance with ISO Test No. 11443:2005 at a shear rate of 1000 $s^{-1}$ and using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm. The melt viscosity is typically determined at a temperature at least 15° C. above the melting temperature. For example, the melt viscosity is typically determined at a temperature of 400° C. for neat polyaryletherketone polymers (e.g., PEEK) and polymer compositions containing such polymers. On the other hand, the melt viscosity is typically determined at a temperature of 350° C. for neat liquid crystalline polymers.

Glass Transition and Melting Temperatures: The glass transition temperature ("Tg") and melting temperature ("Tm") may be determined by differential scanning calorimetry ("DSC") as is known in the art. For semi-crystalline and crystalline materials, the melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation at Break: Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus, Flexural Stress, and Flexural Break Strain: Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Notched Charpy Impact Strength: Notched Charpy properties may be tested according to ISO Test No. ISO 179-1: 2010) (technically equivalent to ASTM D256-10, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Unnotched Charpy Impact Strength; Unnotched Charpy properties may be tested according to ISO Test No. ISO 179. The test is run using a Type 1 specimen (length of 80 mm, width of 10 mm and thickness of 4 mm). The testing temperature may be 23° C.

Flatness Value: The flatness value of a specimen (80 mm×80 mm×1 mm) may be measured using an OGP Smartscope Quest 300 Optical Measurement System. XYZ Measurements may be taken across the specimen starting with X and Y values corresponding to 5, 22.5, 50, 57.5 and 75 mm. Z values may be normalized so that the minimum Z value corresponded to a height of zero. The flatness value is calculated as the average of the 25 normalized Z values.

Coefficient of Linear Thermal Expansion ("CLTE"): Dimensional stability was measured according to ISO 11359 for CLTE measurements from either 50° C.-200° C. or 25° C.-200° C. in the flow direction and the transverse direction.

Mold Shrinkage: Dimensional stability was also determined by measuring the mold shrinkage according to ISO 294. In particular, the shrinkage is determined by obtaining a difference in the dimensions between a dry test specimen and the mold cavity in which it was molded. The shrinkage may be determined in the flow direction and the transverse direction. The testing temperature may be at room temperature.

Dielectric strength: The dielectric strength was determined according to IEC 60243. The thickness for the dielectric strength was 1.5 mm.

Volume Resistivity: The volume resistivity values may be determined in accordance with IEC 60093 (similar to ASTM D257-07). The test may be performed using a 60×60 mm plaque. The test may employ a voltmeter-ammeter method using an electrometer (Keithley K8009 or ETS 823). When tested with the Keithley K-8009, a four minute discharge time and a one minute electrification may be used. When tested using the ETS-823 probe, readings may be taken immediately upon stabilization.

Dielectric Constant and Dissipation Factor: The dielectric constant and dissipation factor were determined according to IEC 60250 at a frequency of 1 MHz and a temperature of 23° C.

Water Absorption: Water absorption tests were conducted according to ISO 62. Test specimens were immersed in distilled water at 23° C. until the water absorption essentially ceased (i.e., saturated).

EXAMPLE 1

Samples 1-6 are formed from various percentages of a polyetheretherketone ("PEEK 1"), a liquid crystalline polymer ("LCP 1" and/or "LCP 2"), and aluminum trihydrate ("ATH"), as indicated in Table 1 below. The PEEK 1 polymer has a melt viscosity of about 140 Pa-s, as determined in accordance with ISO 11443:2005 at a temperature of 400° C. and shear rate of 1000 $s^{-1}$. LCP 1 is derived from approximately 60% HBA, 12.5% BP, 12.5% TA, 12.5% HQ, and 12.5% IA, and has a melting temperature of about 310° C. and a melt viscosity of about 14 Pa-s, as determined at a temperature of 350° C. at a shear rate of 1000 $s^{-1}$. LCP 2 is derived from approximately 60% HBA, 12.5% BP, 12.5% TA, 12.5% HQ, and 12.5% IA, and has a melting temperature of about 310° C. and a melt viscosity of about 3 Pa-s, as determined at a temperature of 350° C. at a shear rate of 1000 $s^{-1}$.

TABLE 1

| Sample | 1 | 2 | 3 | 4 | 5 | 6 |
|---|---|---|---|---|---|---|
| LCP 1 | 10.0 | 20.0 | — | 20.0 | — | — |
| LCP 2 | — | — | 10.0 | — | — | — |
| PEEK 1 | 90.0 | 80.0 | 90.0 | 79.8 | 100.0 | 99.5 |
| Aluminum Trihydrate (ATH) | — | — | — | 0.2 | — | 0.5 |

The melt viscosity of each composition was determined and provided below in Table 2.

TABLE 2

| Sample | 1 | 2 | 3 | 4 | 5 | 6 |
|---|---|---|---|---|---|---|
| MV at 1000 $s^{-1}$ and 400° C. (Pa-s) | 67.2 | 60.5 | 72.8 | 31.8 | 136.0 | 129.0 |

EXAMPLE 2

Samples 7-10 are formed from various percentages of a polyetheretherketone ("PEEK 2" and/or "PEEK 3"), a liquid crystalline polymer ("LCP 1" and/or "LCP 2" and/or "LCP 3"), and aluminum trihydrate ("ATH"), as indicated in Table 3 below. The PEEK 2 polymer has a melt viscosity of about 135 Pa-s, as determined in accordance with ISO 11443:2005 at a temperature of 400° C. and shear rate of 1000 $s^{-1}$. The PEEK 3 polymer has a melt viscosity of about 137 Pa-s, as determined in accordance with ISO 11443:2005 at a temperature of 400° C. and shear rate of 1000 $s^{-1}$. The LCP 3 polymer is derived from approximately 54.5% HBA, 15% BP, 19.5% TA, 6% HNA, and 5% APAP, and has a melting temperature of about 332° C. and a melt viscosity of about 16.8 Pa-s, as determined at a temperature of 350° C. at a shear rate of 1000 $s^{-1}$. The compositions are blended in a 25-mm twin-screw extruder at a melt temperature of 380° C. and at a throughput rate of 30 pounds per hour.

TABLE 3

| Sample | 7 | 8 | 9 | 10 | 11 |
|---|---|---|---|---|---|
| LCP 1 | 16.0 | 10.0 | 26.0 | 20.0 | — |
| LCP 2 | 4.0 | 10.0 | 4.0 | — | — |
| LCP 3 | — | — | — | — | 10.0 |
| PEEK 2 | 80.0 | 80.0 | 70.0 | 79.8 | — |
| PEEK 3 | — | — | — | — | 89.7 |
| ATH | — | — | — | 0.2 | 0.3 |

Parts are injection molded the samples into plaques (60 mm×60 mm). The molded parts are also tested for thermal and mechanical properties. The results are set forth below in Table 4.

TABLE 4

| Sample | 7 | 8 | 9 | 10 | 11 |
|---|---|---|---|---|---|
| MV at 1000 $s^{-1}$ and 400° C. (Pa-s) | 113 | 94 | 85 | 83 | 85 |
| Density (g/ml) | 1.32 | 1.32 | 1.32 | 1.32 | 1.31 |

TABLE 4-continued

| Sample | 7 | 8 | 9 | 10 | 11 |
|---|---|---|---|---|---|
| Charpy Notched (kJ/m$^2$) | 2.9 | 2.8 | 3.1 | 3.1 | 6 |
| Charpy Unnotched Impact Strength (kJ/m$^2$) | — | — | — | — | 41 |
| Tensile Strength (MPa) | 108 | 131 | 138 | 111 | 108 |
| Tensile Modulus (MPa) | 4,881 | 5,683 | 8,501 | 5,977 | 4,090 |
| Tensile Elongation at Break (%) | 3.2 | 2.8 | 2.2 | 2.4 | 4.4 |
| Flexural Strength (MPa) | 134 | 141 | 141 | 144 | 130 |
| Flexural Modulus (MPa) | 4,819 | 5,137 | 5,695 | 5,175 | 4,150 |
| DTUL (° C.) | — | — | — | — | 153 |
| Melting Temperature (° C.) | — | — | — | — | 343 |
| Glass Transition Temperature (° C.) | — | — | — | — | 143 |
| CLTE (flow direction; 50° C.-100° C.) (ppm/° C.) | — | — | — | — | 42 |
| CLTE (flow direction; 100° C.-150° C.) (ppm/° C.) | — | — | — | — | 53 |
| CLTE (flow direction; 150° C.-200° C.) (ppm/° C.) | — | — | — | — | 75 |
| CLTE (transverse direction; 50° C.-100° C.) (ppm/° C.) | — | — | — | — | 58 |
| CLTE (transverse direction; 100° C.-150° C.) (ppm/° C.) | — | — | — | — | 75 |
| CLTE (transverse direction; 150° C.-200° C.) (ppm/° C.) | — | — | — | — | 145 |

EXAMPLE 3

Samples 12-14 are formed from various percentages of a polyetheretherketone ("PEEK 3"), a liquid crystalline polymer ("LCP 1" and/or "LCP 3"), glass fibers ("Glass Fibers 1" and/or "Glass Fibers 2"), and ATH as indicated in Table 5 below. The PEEK 3 polymer has a melt viscosity of about 137 Pa-s, as determined in accordance with ISO 11443:2005 at a temperature of 400° C. and shear rate of 1000 s$^{-1}$. The designation "Glass Fibers 1" refers to circular glass fibers (aspect ratio of 1) available from Owens Corning under the name 910A-10P, and the designation "Glass Fibers 2" refers to flat, chopped glass fiber strands (aspect ratio of 4) available from Taishan under the name RENEX™ FF-5061. The compositions are blended in a 25-mm twin-screw extruder at a melt temperature of 380° C. and at a throughput rate of 30 pounds per hour.

TABLE 5

| Sample | 12 | 13 | 14 |
|---|---|---|---|
| LCP 1 | 14.0 | — | — |
| LCP 3 | — | — | 11.0 |
| Glass Fibers 1 | 30.0 | 30.0 | — |
| Glass Fiber 2 | — | — | 30.0 |
| PEEK 3 | 55.8 | 70.0 | 58.8 |
| ATH | 0.2 | — | 0.2 |

Parts are injection molded the samples into plaques (60 mm×60 mm). The molded parts are also tested for thermal and mechanical properties. The results are set forth below in Table 6.

TABLE 6

| Sample | 12 | 13 | 14 |
|---|---|---|---|
| MV at 1000 s$^{-1}$ and 400° C. (Pa-s) | 177 | 285 | 130 |
| Density (g/ml) | 1.53 | 1.51 | 1.53 |
| Charpy Notched (kJ/m$^2$) | 11.0 | 9.1 | 12.7 |
| Charpy Unnotched Impact Strength (kJ/m$^2$) | — | — | 51 |
| Tensile Strength (MPa) | 188 | 197 | 190 |
| Tensile Modulus (MPa) | 12,774 | 11,468 | 13,000 |
| Tensile Elongation at Break (%) | 2.0 | 2.6 | 2.1 |
| Flexural Strength (MPa) | 271 | 281 | 278 |
| Flexural Modulus (MPa) | 11,479 | 10,421 | 11,800 |
| Flexural Break Strain (%) | 2.6 | 3.1 | — |
| DTUL (° C.) | 328 | 327 | 327 |
| Melting Temperature (° C.) | — | — | 343 |
| Glass Transition Temperature (° C.) | — | — | 143 |
| CLTE (flow direction; 25° C.-100° C.) (ppm/° C.) | — | — | 16 |
| CLTE (flow direction; 100° C.-150° C.) (ppm/° C.) | — | — | 17 |
| CLTE (flow direction; 150° C.-200° C.) (ppm/° C.) | — | — | 10 |
| CLTE (transverse direction; 25° C.-100° C.) (ppm/° C.) | — | — | 46 |
| CLTE (transverse direction; 100° C.-150° C.) (ppm/° C.) | — | — | 62 |
| CLTE (transverse direction; 150° C.-200° C.) (ppm/° C.) | — | — | 102 |
| Dielectric Strength (kV/mm) | — | — | 32 |
| Volume Resistivity (Ohms · cm) | — | — | 10$^{10}$ |
| Dielectric Constant | — | — | 3.6 |
| Dissipation Factor | — | — | 0.006 |
| Mold Shrinkage (flow direction) (%) | — | — | 0.3 |
| Mold Shrinkage (transverse direction) (%) | — | — | 0.8 |
| Water Absorption (%) | — | — | 0.4 |

EXAMPLE 4

Samples 15-18 are formed from various percentages of a polyetheretherketone ("PEEK"), a liquid crystalline polymer ("LCP"), glass fibers ("Glass Fiber 1" or Glass Fiber "2) and aluminum trihydrate ("ATH"), as indicated in Table 7 below. The PEEK polymer has a melt viscosity of about 165 Pa-s, as determined in accordance with ISO 11443:2005 at a temperature of 400° C. and shear rate of 1000 s$^{-1}$. The LCP is derived from approximately 60% HBA, 12.5% BP, 12.5% TA, 12.5% HQ, and 12.5% IA, and has a melting temperature of about 310° C. and a melt viscosity of about 14 Pa-s, as determined at a temperature of 350° C. at a shear rate of 1000 s$^{-1}$. The designation "Glass Fiber 1" refers to circular glass fibers (aspect ratio of 1) available from Owens Corning under the name 910A-10P, and the designation "Glass Fiber 2" refers to flat, chopped glass fiber strands (aspect ratio of 4) available from Taishan under the name RENEX™

FF-5061. The compounding was carried out in a 25-mm twin-screw extruder at a melting temperature of 380° C. and throughput rate of 30 lb/hr.

TABLE 7

| Sample | 15 | 16 | 17 | 18 |
|---|---|---|---|---|
| PEEK | 55.8 | 55.8 | 70.0 | 70.0 |
| LCP | 14.0 | 14.0 | — | — |
| Glass Fiber 1 | — | 30.0 | — | 30.0 |
| Glass Fiber 2 | 30.0 | — | 30.0 | — |
| Aluminum Trihydrate (ATH) | 0.2 | 0.2 | — | — |

Parts are injection molded the samples into plaques (80 mm×80 mm×1 mm). The molded parts are also tested for thermal and mechanical properties. The results are set forth below in Table 8.

TABLE 8

| Sample | 15 | 16 | 17 | 18 |
|---|---|---|---|---|
| MV at 1000 s$^{-1}$ and 400° C. (Pa-s) | 117 | 121 | 249 | 291 |
| Charpy Notched (kJ/m$^2$) | 12.7 | 10.2 | 10.2 | 10 |
| Tensile Strength (MPa) | 190 | 183 | 191 | 200 |
| Tensile Modulus (MPa) | 12,760 | 12,291 | 11,440 | 11,106 |
| Tensile Elongation at Break (%) | 2.2 | 2.2 | 2.4 | 2.8 |
| Flexural Strength (MPa) | 278 | 277 | 284 | 295 |
| Flexural Modulus (MPa) | 11,835 | 11,358 | 11,231 | 11,030 |
| DTUL (° C.) | 327 | 321 | 327 | 323 |
| Flatness Value (mm) | 0.86 | 2.26 | 0.85 | 5.27 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition that comprises at least one polyaryletherketone and from about 1 to about 100 parts of at least one liquid crystalline polymer per 100 parts of the polyaryletherketone, wherein the composition is formed by melt processing the polyaryletherketone and the liquid crystalline polymer in the presence of a flow modifier, wherein the flow modifier includes a functional compound that includes a metal hydroxide, metal alkoxide, metal salt hydrate, or a combination thereof.

2. The polymer composition of claim 1, wherein the functional compound is present in an amount from about 0.05 to about 5 parts by weight per 100 parts by weight of the polyaryletherketone.

3. The polymer composition of claim 1, wherein the ratio of the melt viscosity of the polymer composition to the melt viscosity of the polyaryletherketone is about 0.80 or less, as determined in accordance with ISO Test No. 11443:2005 at a temperature of 400° C. and a shear rate of 1000 s$^{-1}$.

4. The polymer composition of claim 1, wherein the polymer composition has a melt viscosity of from about 0.1 to about 250 Pa-s as determined in accordance with ISO Test No. 11443:2005 at a temperature of 400° C. and shear rate of 1000 s$^{-1}$.

5. The polymer composition of claim 1, wherein the liquid crystalline polymer contains repeating units derived from naphthenic hydroxycarboxylic acids, naphthenic dicarboxylic acids, or a combination thereof in an amount of no more than about 8 mol.%.

6. The polymer composition of claim 1, wherein the liquid crystalline polymer consists essentially of repeating units derived from 4-hydroxybenzoic acid; repeating units derived from terephthalic acid and/or isophthalic acid; and repeating units derived from 4,4'-biphenol and/or hydroquinone.

7. The polymer composition of claim 6, wherein the monomer units derived from 4-hydroxybenzoic acid constitute from about 40 mol.% to about 85 mol.% of the liquid crystalline polymer.

8. The polymer composition of claim 7, wherein the monomer units derived from terephthalic acid and isophthalic acid each constitute from about 1 mol.% to about 30 mol.% of the liquid crystalline polymer, and the monomer units derived from hydroquinone and 4,4-biphenol each constitute from about 1 mol.% to about 30 mol.% of the liquid crystalline polymer.

9. The polymer composition of claim 1, wherein the polyaryletherketone has a glass transition temperature of from about 110° C. to about 200° C.

10. The polymer composition of claim 1, wherein the polyaryletherketone has a melt viscosity of about 80 Pa-s or more, as determined in accordance with ISO Test No. 11443:2013 at a shear rate of 1000 s$^{-1}$ and temperature of 400° C.

11. The polymer composition of claim 1, wherein the polyaryletherketone contains a moiety having the structure of Formula (I) and/or Formula (II):

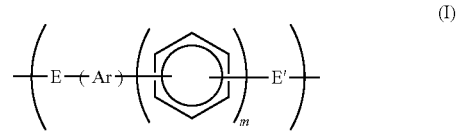

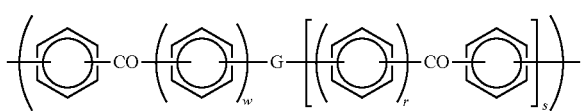

wherein,
m and r are independently zero or a positive integer;
s and w are independently zero or a positive integer;
E and E' are independently an oxygen atom or a direct link;
G is an oxygen atom, a direct link, or —O-Ph-O— where Ph is a phenyl group; and
Ar is one of the following moieties (i) to (vi), which is bonded via one or more of phenyl moieties to adjacent moieties:

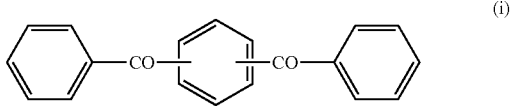

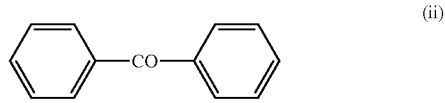

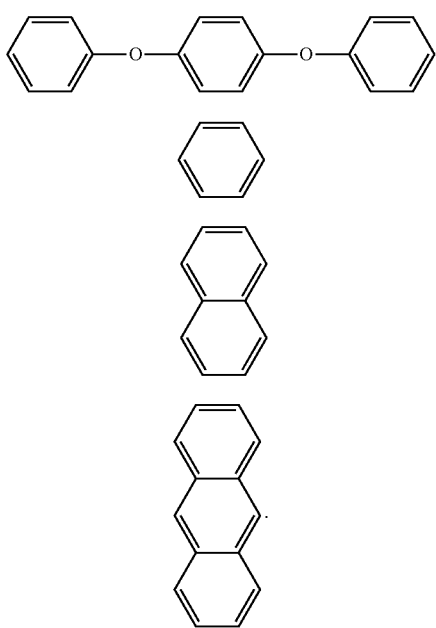

12. The polymer composition of claim 11, wherein the polyaryletherketone contains a repeat unit of the following general Formula (III):

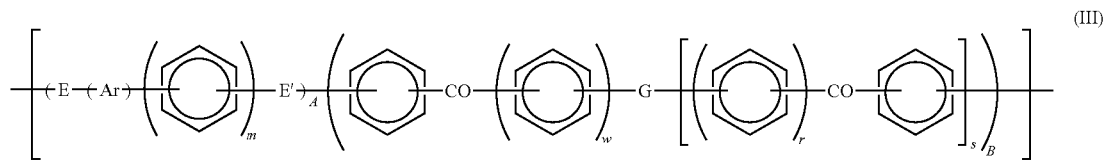

wherein,
A and B are independently 0 or 1.

13. The polymer composition of claim 11, wherein the polyaryletherketone contains a repeat unit of the following general Formula (IV):

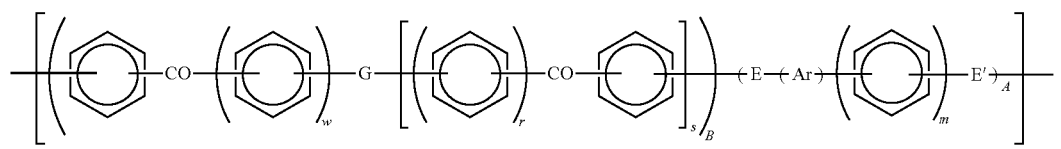

wherein,
A and B are independently 0 or 1.

14. The polymer composition of claim 1, wherein the polyaryletherketone is polyetheretherketone, polyetherketone, polyetherketoneketone, polyetherketoneetherketoneketone, polyetheretherketoneketone, polyether-diphenyl-ether -ether-diphenyl-ether-phenyl-ketone-phenyl, or a blend or copolymer thereof.

15. The polymer composition of claim 1, wherein the functional compound includes a metal hydroxide compound.

16. The polymer composition of claim 15, wherein the metal hydroxide compound is copper (II) hydroxide, potassium hydroxide, sodium hydroxide, magnesium hydroxide, calcium hydroxide, aluminum hydroxide, or a combination thereof.

17. The polymer composition of claim 1, wherein the functional compound includes a metal alkoxide, metal salt hydrate, or a combination thereof.

18. The polymer composition of claim 17, wherein the hydrate is $CaCl_2.H_2O$, $ZnCl_2.4H_2O$, $CoCl_2.6H_2O$, $CaSO_4.2H_2O$, $MgSO_4.7H_2O$, $CuSO_4.5H_2O$, $Na_2SO_4.10H_2O$, $Na_2CO_3.10H_2O$, $Na_2B_4O_7.10H_2O$, $Ba(OH)_2.8H_2O$, or a combination thereof.

19. The polymer composition of claim 1, wherein the functional compounds further includes a hydroxy-functional organic compound, carboxy-functional organic compound, or a combination thereof.

20. The polymer composition of claim 1, wherein the polymer composition contains no more than about 5 wt.% of fillers.

21. The polymer composition of claim 20, wherein the polyaryletherketone constitutes from about 60 wt.% to about 99.5 wt.% of the composition.

22. The polymer composition of claim 1, wherein the polymer composition contains from about 5 wt.% to about 70 wt.% of fillers.

23. The polymer composition of claim 22, wherein the polyaryletherketone constitutes from about 10 wt.% to about 80 wt.% of the composition.

24. The polymer composition of claim 20, wherein the filler includes glass fibers.

25. The polymer composition of claim 24, wherein the glass fibers have an aspect ratio of from about 1.5 to about 10, the aspect ratio being defined as the cross-sectional width of the fibers divided by the cross-sectional thickness of the fibers.

26. A molded article comprising the polymer composition of claim 1.

27. A method for forming the polymer composition of claim 1, the method comprising melt processing the polyaryletherketone and the liquid crystalline polymer in the presence of the flow modifier.

28. The method of claim 27, wherein melt processing occurs at a temperature of from about 250° C. to about 400° C.

29. The method of claim 27, wherein the ratio of the melt viscosity of the polymer composition to the melt viscosity of the polyaryletherketone is about 0.80 or less, as determined in accordance with ISO Test No. 11443:2005 at a temperature of 400° C. and a shear rate of 1000 s$^{-1}$.

* * * * *